United States Patent [19]

Wang

[11] Patent Number: 5,129,675

[45] Date of Patent: Jul. 14, 1992

[54] OCCUPANT RESTRAINT CUSHION

[75] Inventor: Jenne-Tai Wang, Troy, Mich.

[73] Assignee: General Motors Corporation, Detroit, Mich.

[21] Appl. No.: 694,604

[22] Filed: May 2, 1991

[51] Int. Cl.⁵ .................................................. B60R 21/16
[52] U.S. Cl. ...................................................... 280/743
[58] Field of Search ............... 280/743, 728, 729, 730, 280/731, 732, 738, 739

[56] References Cited

U.S. PATENT DOCUMENTS

| | | | |
|---|---|---|---|
| 3,451,694 | 6/1969 | Hass | 280/743 |
| 3,614,129 | 10/1971 | Sobkow | 280/730 |
| 3,630,472 | 12/1971 | Axenborg | 244/122 |
| 3,733,091 | 5/1973 | Fleck et al. | 280/743 |
| 3,795,414 | 3/1974 | Ventre et al. | 280/730 |
| 3,879,056 | 4/1975 | Kawashima et al. | 280/743 |
| 4,262,931 | 4/1981 | Strasser et al. | 280/729 |
| 4,290,267 | 9/1981 | Cumming et al. | 280/729 |
| 4,300,894 | 11/1981 | Cumming et al. | 280/729 |
| 5,022,675 | 6/1991 | Zelenak, Jr. et al. | 280/743 |

Primary Examiner—Kenneth R. Rice
Assistant Examiner—Karin Tyson
Attorney, Agent, or Firm—Herbert Furman

[57] ABSTRACT

An occupant restraint cushion includes an internal horizontal wall interconnecting the front and rear walls thereof and subdividing the cushion into upper and lower compartments for respective engagement by the head and torso of the occupant. The horizontal subdividing wall and one or more additional horizontal walls angularly divergent thereto control the curvature of the front wall of the cushion to limit membrane forces applied by such wall to the head of the occupant. The cushion further includes one or more pairs of vertical walls or vertical subdividers which interconnect the horizontal subdividing wall and the front wall of the cushion, through the additional horizontal walls, to subdivide the upper compartment of the cushion into subcompartments which operate independently of each other when engaged by the head of the occupant.

2 Claims, 2 Drawing Sheets 6,129,675

OCCUPANT RESTRAINT CUSHION

BACKGROUND OF THE INVENTION

This invention relates to occupant restraint cushions and, more particularly, to an inflatable occupant restraint cushion having multiple compartments, each compartment having a preset shape and mode of operation suited to the part of the vehicle occupant's body intended to engage or impact such compartment.

It is known to provide occupant restraint cushions which are internally divided into compartments by internal walls. This is done for various reasons, such as: controlling the pressure differential between one compartment and another compartment during inflation of the cushion or during occupant engagement with the cushion; controlling the shape of the cushion; providing for the aspiration of ambient atmosphere into the cushion as it is inflated; and controlling deflation of the cushion.

The occupant restraint cushion of this invention has upper and lower compartments, each of which has a preset shape suited for respective engagement by the head and torso of a vehicle occupant. The upper compartment is subdivided into subcompartments which are operative independently of each other to control movement of the head of the occupant relative thereto. The compartments and subcompartments are in fluid communication with each other and all are at the same pressure when the cushion is inflated. The head engageable front walls of the subcompartments of the upper compartment of the cushion are shaped to control the membrane forces applied by such walls to the head of the occupant when engaged therewith.

In the preferred embodiment of the invention, the occupant restraint cushion is subdivided into the upper and lower compartments by a generally horizontal internal tether or wall having its front and rear edges sewn or secured to corresponding front and rear walls of the cushion, with the front and rear walls of the cushion being designated as such with respect to the occupant. The general horizontal subdividing wall and one or more additional generally horizontal walls angularly divergent thereto control the shape or curvature of the head engageable front wall of the upper compartment of the cushion to limit the membrane forces applied by such wall to the head of the occupant when engaged therewith. The generally horizontal walls taper between their front and rear secured edges to space their side edges from the side walls of the cushion and permit pressure fluid to freely circulate between the upper and lower compartments of the cushion.

One or more vertical subdividers or pairs of slightly spaced external vertical walls subdivide the front section of the upper compartment into individually operative subcompartments, the front walls of which are provided by the front wall of the upper compartment. The vertical walls of each pair have their lower edges sewn or secured to the subdividing generally horizontal wall and extend freely upwardly through respective slots or openings in the one or more additional angularly divergent generally horizontal walls. The rear edges of the walls of each pair are sewn or secured to each other and the forward edges of such walls are each secured to the front wall of the upper compartment adjacent one side of a slot or opening therein. The head of the occupant may engage the front wall of one or more subcompartments. By providing independently operative subcompartments, movement of the head of the occupant relative to the upper compartment is controlled.

The number of vertical subdividers determines the number of individually operative subcompartments in the front section of the upper compartment. If one such subdivider is provided, two individually operative subcompartments will result. Each will include an outer side wall provided by the outer side wall of the upper compartment, an inner side wall provided by one of the walls of the subdivider, a front wall provided by the front wall of the upper compartment, and a lower wall provided by the subdividing generally horizontal wall. The individually operative subcompartments all open to the rear section of the upper compartment and can be of the same or different size. If more than one vertical subdivider is provided, the number of resulting individually operative subcompartments will be equal to the number of such subdividers plus one.

The primary feature of this invention is that it provides an inflatable occupant restraint cushion having multiple compartments, each having a preset shape and mode of operation suited to the part of the occupant's body intended to engage such compartment. Another feature is that the cushion has upper and lower compartments intended for respective engagement by the head and torso of the occupant. A further feature is that the front or head engageable wall of the upper compartment is shaped to control the membrane forces applied to the head of the occupant impacting such wall. Yet another feature is that the compartments are at the same pressure when the cushion is inflated. Yet a further feature is that the upper compartment is subdivided into subcompartments, each of which is independently operative when engaged by the head of the occupant. Still another feature is that the upper compartment is separated from the lower compartment by a generally horizontal subdividing wall which permits pressure fluid to circulate between the upper and lower compartments. Still a further feature is that the subcompartments of the upper compartment are provided by one or more pairs of external vertical walls or subdividers extending between one of the generally horizontal subdividing wall and the front or head engageable wall of the upper compartment. Yet an additional feature is that the front or head engageable wall of the upper compartment is preshaped by the horizontal subdividing wall and additional horizontal walls angularly divergent thereto.

These and other features of this invention will be readily apparent from the following specification and drawings wherein.

Figure 1:
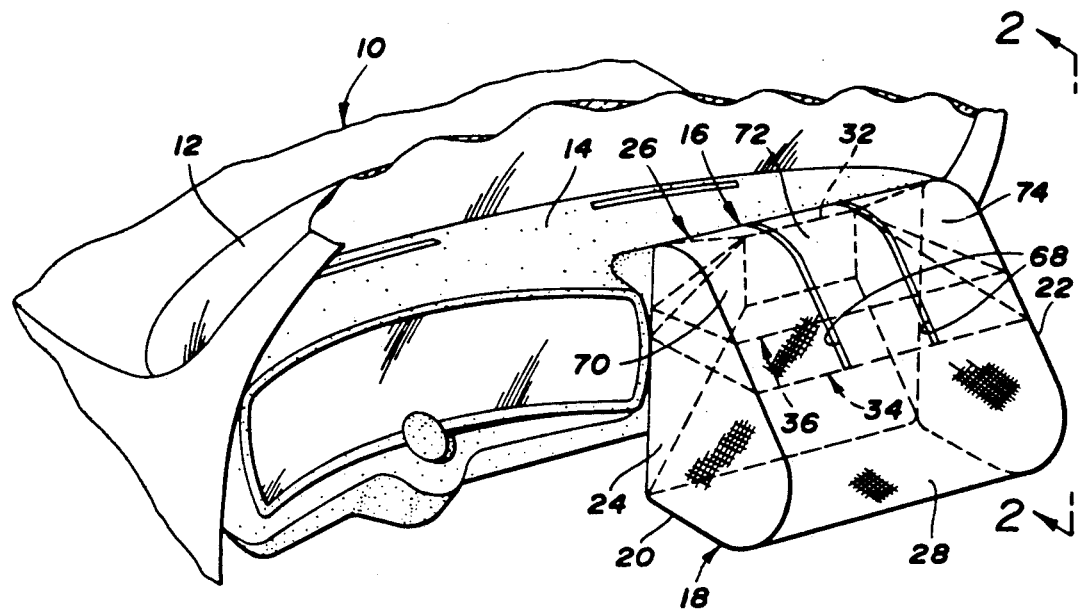
FIG. 1 is a partial view of a vehicle having an occupant restraint cushion according to this invention, with the cushion being shown in inflated condition.

Referring now to FIG. 1 of the drawings, a vehicle 10 includes a windshield 12 and an instrument panel 14. Mounted within the right hand or passenger side of the instrument panel is a conventional passenger occupant restraint system 16 which includes an inflatable occupant restraint cushion 18 according to this invention. The details of the system 16 are not shown or described since they are conventional and not necessary to an understanding of this invention.

Although the cushion 18 is shown in its inflated condition, it will be understood that the cushion 18 is normally housed within the instrument panel 14 in a folded condition and inflated from a source of pressure fluid, such as an inflator, when a signal is received by the system 16 from a velocity, acceleration, or electromagnetic type sensor mounted on vehicle 10.

Figure 2:
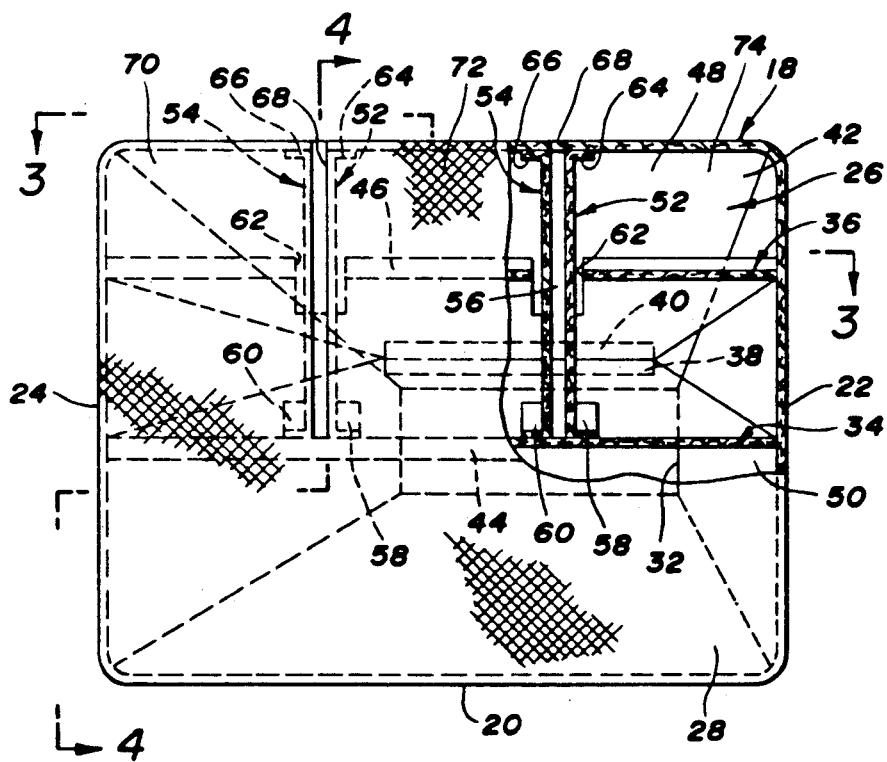
FIG. 2 is an enlarged partially broken away view taken generally along line 2—2 of FIG. 1.
Figure 3:
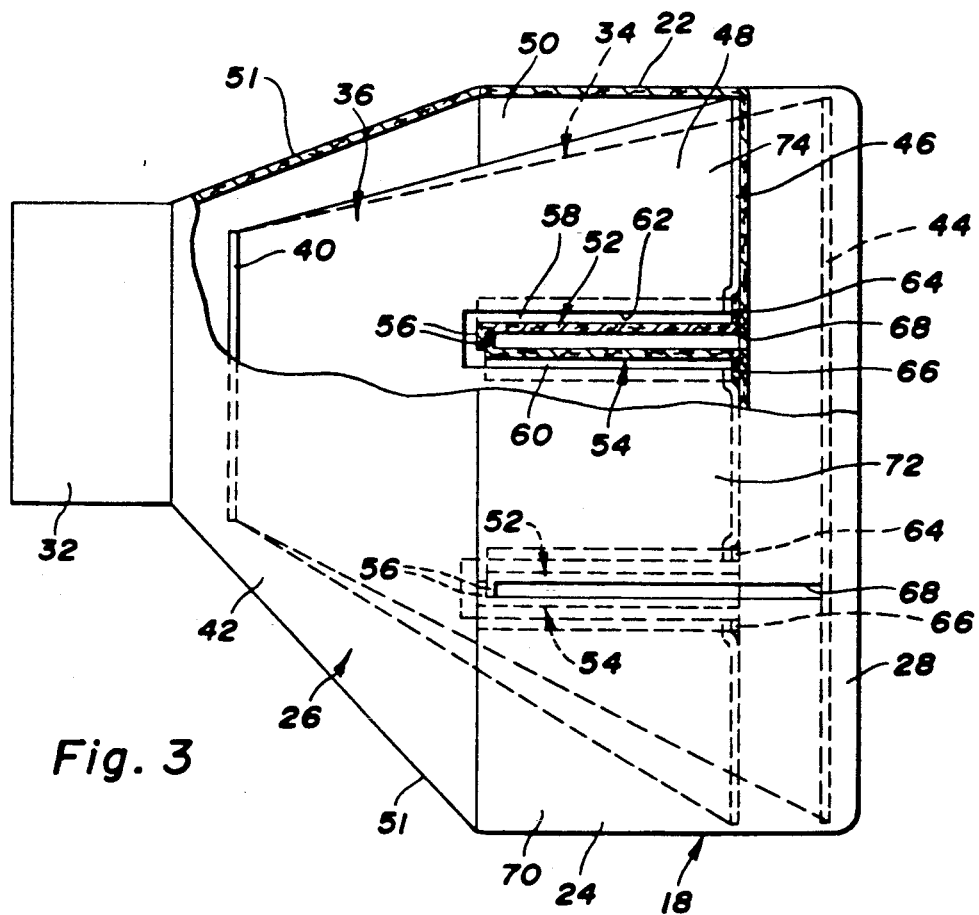
FIG. 3 is a partially broken away view taken generally along line 3—3 of FIG. 2; and, FIG. 4 is a partially broken away view taken along line 4—4 of FIG. 2.
Figure 4:
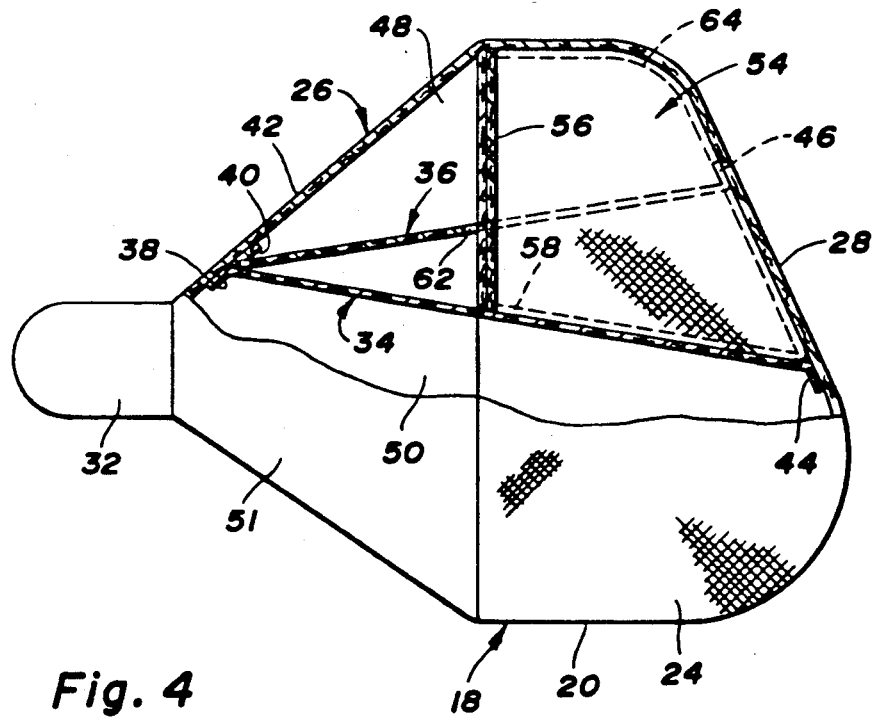

Referring now to FIGS. 2 through 4 of the drawings, cushion 18 includes a lower exterior wall 20, right hand and left hand exterior side walls 22 and 24 respectively, a generally truncated pyramidal shaped exterior rear wall 26, and an exterior front wall 28. The walls 20, 22, 24, 26, and 28 are formed of conventional cushion material and are sewn or otherwise secured to each other. The walls 20 and 28 may be integral with each other, as shown, or formed separately and sewn or otherwise secured to each other. The rear wall 26 is asymmetrical and formed of a number of wall sections sewn or otherwise secured to each other. The cushion 18 includes an inlet 32 of the same material as the exterior walls and sewn or otherwise to the rear wall 26. The inlet 32 is suitably connected to the inflator or other source of pressure fluid to inflate the cushion.

The cushion 18 includes a lower generally horizontal subdividing wall or tether 34 and an upper generally horizontal wall or tether 36 angularly divergent thereto. The respective rear edges or flanges 38 and 40 of walls 34 and 36 are sewn or secured to the inside of the upper wall section 42 of the rear wall 26. The respective front edges or flanges 44 and 46 of walls 34 and 36 are sewn or otherwise secured to the inside of the front wall 28. The subdividing horizontal wall 34 subdivides the interior of cushion 18 into an upper compartment 48 and a lower compartment 50. The angularly divergent wall 36 cooperates with wall 34 in controlling the shape or curvature of the front wall 28 of the upper compartment. More than one wall 36 may be provided if desired or necessary. As shown in FIG. 3, the walls 34 and 36 are generally of tapered shape so that the side edges of these walls are spaced from the side sections 51 of the rear wall 26 and the side walls 22 and 24 to permit pressure fluid from the inflator to flow to both the upper and lower compartments 48 and 50 and maintain both compartments at the same pressure.

A first and second vertical subdivider or pair of outer and inner vertical exterior walls 52 and 54, respectively, are slightly spaced from each other and have their rear edges 56 overlapped and sewn or otherwise secured to each other. The lower edges or flanges 58 and 60, respectively, of the walls 52 and 54 extend oppositely of each other and are sewn or otherwise secured to the lower horizontal wall 34. The walls 52 and 54 extend freely through a slot or opening 62 in the upper horizontal wall 36. The respective front and upper edges or flanges 64 and 66 of the walls 52 and 54 are sewn or otherwise secured to the inside of the front wall 28 of the cushion 18 to each side of a linear slot or opening 68 traversing such front wall. Each pair of walls 52 and 54 defines a vertical slot or enclosure opening outwardly through wall 28.

The walls 52 and 54 cooperate with the walls 22, 24, 28 and 34 to subdivide the front section of the upper compartment 48 into the three subcompartments 70, 72, and 74, each of which is independently operative or collapsible relative to the others to absorb impact when the front wall 28 thereof is engaged by the head of the occupant. By providing at least two such subcompartments, relative movement between the head of the occupant and the front wall 28 of the cushion is controlled. It will be understood that the head of the occupant can engage more than one such subcompartment, and that in such instance, the engaged subcompartments will still operate independently of each other or independently collapse to absorb the impact.

Although two spaced pairs of walls 52 and 54 and slots 66 are shown, it will be understood that either one pair of such walls or more than two pairs of such walls may be provided. Further, although the pairs of walls 52 and 54 are shown equally spaced from each other and from the exterior side walls 22 and 24, such spacing of the pairs of walls relative to each other and to the exterior side walls 22 and 24 may be varied as desired.

As previously mentioned, the walls 34 and 36 control the shape or curvature of the front wall 28. As shown in FIG. 4, these walls 34 and 36 flatten the curvature of the front walls 28 of the subcompartments 70, 72, and 74 to limit the membrane forces applied by such front walls to the head of the occupant when engaged therewith.

Thus, this invention provides an occupant restraint cushion having multiple compartments, each having a preset shape and mode of operation suited to the part of the vehicle occupant's body which is intended to engage or impact such compartment.

The embodiments of the invention in which an exclusive property or privilege is claimed are defined as follows:

1. An occupant restraint cushion comprising, in combination lower wall means, side wall means, rear wall means, and front wall means, the wall means being secured to each other to form the cushion, horizontal wall means interconnecting the rear wall means and the front wall means intermediately of the extent of the front wall means to subdivide the cushion into upper and lower compartments respectively engageable by the head and torso of the occupant, means interconnecting the rear wall means and the front wall means of the upper compartment and cooperating with the horizontal wall means to control the shape of the front wall means of such upper compartment, the horizontal wall means including means permitting fluid communication between the upper and lower compartments, and closely spaced vertical wall means extending between the horizontal wall means and a respective edge of an elongated opening in the front wall means of the cushion, the vertical wall means defining an enclosed slot opening outwardly through such front wall means and subdividing the upper compartment into a plurality of independently operative subcompartments.

2. An occupant restraint cushion comprising, in combination lower wall means, side wall means, rear wall means, and front wall means, the wall means being secured to each other to form the cushion, first horizontal wall means interconnecting the rear wall means and the front wall means intermediately of the extent thereof to subdivide the cushion into upper and lower compartments respectively engageable by the head and torso of the occupant, second horizontal wall means interconnecting the rear wall means and the front wall means of the upper compartment and cooperating with the first horizontal wall means to control the shape of the front wall means of such upper compartment, the horizontal wall means including means providing fluid communication between the upper and lower compartments, and a pair of closely spaced vertical wall means extending from the first horizontal wall means through the second horizontal wall means to the front wall means, each such vertical wall means being secured to the front wall means adjacent one edge of an elongated opening therethrough to subdivide the upper compartment into a plurality of independently operative sub-compartments.

* * * * *